United States Patent [19]
Lund et al.

[11] Patent Number: 5,385,587
[45] Date of Patent: Jan. 31, 1995

[54] METHODS AND APPARATUS FOR PASTING BATTERY CURRENT COLLECTORS

[75] Inventors: David L. Lund, Minneapolis; Donald W. Groff, Eagan, both of Minn.; James J. Bonk, Columbus, Ga.; Kenneth S. Rumsey, Phenix City, Ala.

[73] Assignee: GNB Battery Technologies Inc., Mendota Heights, Minn.

[21] Appl. No.: 105,508

[22] Filed: Aug. 11, 1993

[51] Int. Cl.⁶ .................................. H01M 4/20
[52] U.S. Cl. ................... 29/623.5; 29/730; 141/1.1; 141/32; 141/280
[58] Field of Search .................. 29/2, 623.5, 730; 141/1.1, 32, 33, 280; 427/190, 194

[56] References Cited

U.S. PATENT DOCUMENTS

| | | | |
|---|---|---|---|
| 1,659,654 | 2/1928 | Hazelett | 29/2 |
| 2,068,601 | 1/1937 | Galloway | 141/32 |
| 2,081,943 | 6/1937 | Lund | 226/39 |
| 2,081,944 | 6/1937 | Lund | 226/39 |
| 2,375,424 | 5/1945 | Lund | 226/39.6 |
| 2,555,301 | 6/1951 | Chubb | 136/67 |
| 2,680,547 | 6/1954 | Donath | 226/39.6 |
| 2,949,940 | 8/1960 | Lozo | 141/32 |
| 3,941,615 | 3/1976 | McDowall | 136/38 |
| 4,022,951 | 5/1977 | McDowall | 429/149 |
| 4,209,575 | 6/1980 | McDowall et al. | 429/146 |
| 4,239,839 | 12/1980 | McDowall et al. | 429/154 |
| 4,271,586 | 6/1981 | McCartney | 29/623.5 |
| 4,307,758 | 12/1981 | McDowall et al. | 141/1.1 |
| 4,318,430 | 3/1982 | Perman | 141/32 |
| 4,338,978 | 7/1982 | Devitt et al. | 141/1.1 |
| 4,606,383 | 8/1986 | Yanik | 141/32 |
| 4,878,521 | 11/1989 | Fredrickson | 141/1.1 |
| 4,932,443 | 6/1990 | Karolek et al. | 141/1.1 |
| 4,935,317 | 6/1990 | Fauteux et al. | 429/192 |
| 5,100,747 | 3/1992 | Hayashida et al. | 429/101 |
| 5,146,958 | 9/1992 | Bugnet et al. | 141/1.1 |

*Primary Examiner*—Stephen Kalafut
*Attorney, Agent, or Firm*—Leydig, Voit & Mayer, Ltd.

[57] ABSTRACT

An apparatus for pasting a battery collector assembly having a current collector and enlarged members having a top surface and a bottom surface and a thickness greater than the current collector is provided. The current collector has at least one predetermined area into which paste is to be filled. The apparatus comprises a paste-dispensing nozzle having an orifice located in a dispensing end of the nozzle. The nozzle is mounted to dispense paste in at least one paste area of the collector assembly. The nozzle dispensing end is adapted to size a first level of paste dispensed in the paste area on one side of the current collector, and a surface is provided opposite the dispensing end of the nozzle which is adapted to size a second level of paste dispensed in the paste area on the other side of the current collector. The clearance between the nozzle dispensing end and opposing sizing surface is adjusted such that paste is dispensed from the nozzle, flows into the paste area of the collector assembly, and is sized such that the first level is intermediate the stop surface of the enlarged members and the current collector and the second level is intermediate the current collector and the bottom surface of the enlarged members. Thus, the enlarged portions of the collector assembly are left substantially free of paste.

32 Claims, 3 Drawing Sheets

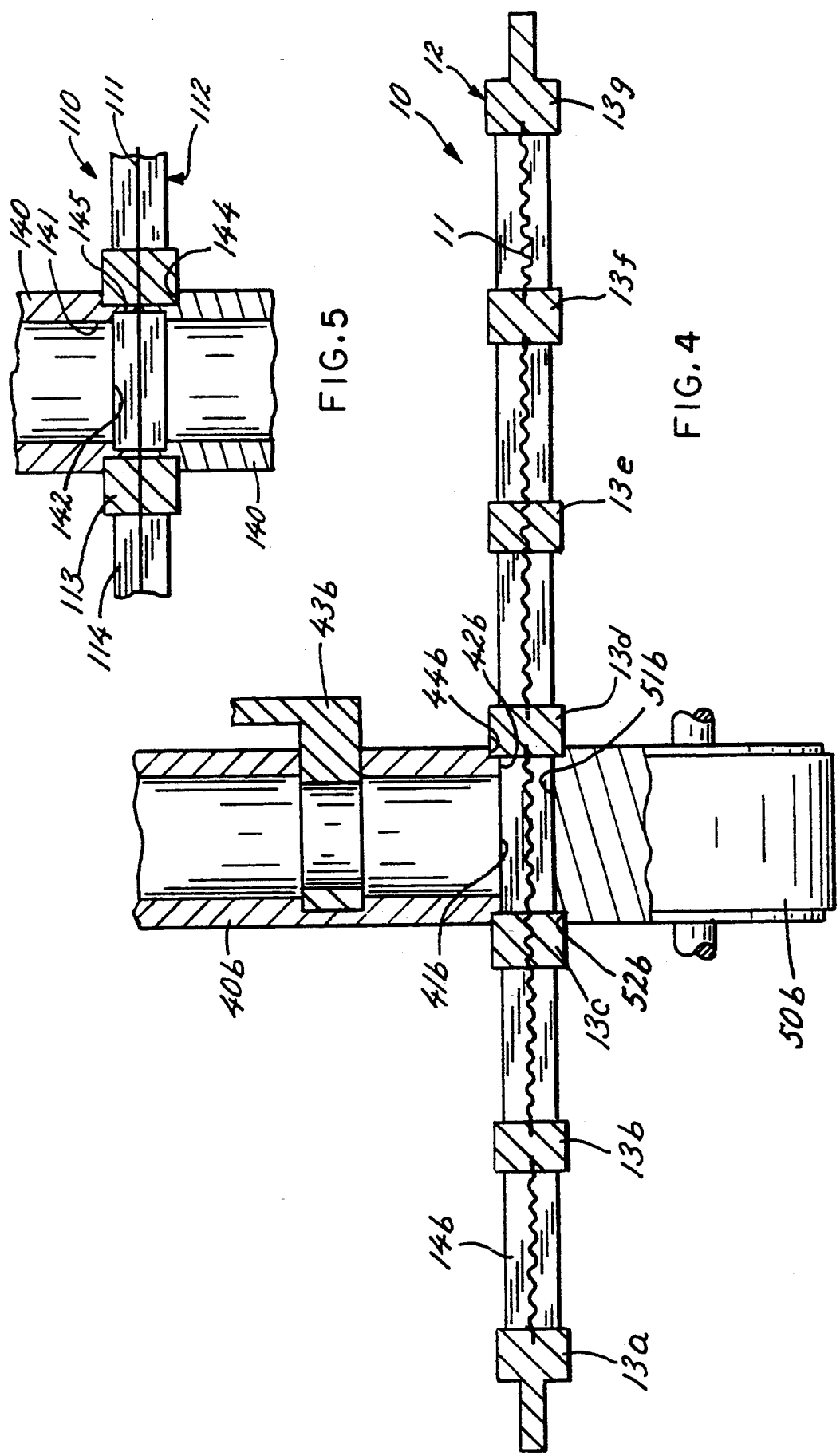

METHODS AND APPARATUS FOR PASTING BATTERY CURRENT COLLECTORS

FIELD OF THE INVENTION

This invention relates to methods and apparatus for applying electrochemically active paste to current collectors for lead-acid electric storage batteries, and especially, to methods and apparatus for pasting current collectors useful in modular lead-acid storage batteries.

BACKGROUND OF THE INVENTION

Modular multicell batteries represent a total departure from traditional designs for SLI automotive lead-acid batteries. Traditional designs incorporate a pre-molded container divided into individual cell compartments. Battery plates and separators are separately formed and are inserted into the cell compartments during assembly of the battery.

Modular battery designs, such as those disclosed in U.S. Pat. Nos. 4,239,839 and 4,209,579 to W. McDowall et al. and U.S. Pat. Nos. 4,022,951 and 3,941,615 to W. McDowall, however, do not have a premolded container. Instead, the container, such as it is, is formed by assembling the battery plates and separators themselves, a process which is made possible by the unique structure of the plate and separator assemblies used in modular batteries.

Traditionally designed lead-acid, SLI batteries have plates consisting of a grid-like alloy current collector which is layered with electrochemically active paste to form a plate. The plates in modular batteries, however, are fabricated from collector assemblies. The collector assemblies have a lead alloy current collector, usually in the form of a mesh or sheet, which is molded into a thermoplastic frame. The thermoplastic frame has various dividers which define a number of areas into which positive and negative paste is applied. The separator assemblies are similar, having separator material molded into a thermoplastic frame of like construction.

After the collector assemblies are pasted to form plates, the plates are stacked along with separator assemblies, and the perimeter members of the thermoplastic frames are welded together to create a leak-tight container. Likewise, dividers in adjacent frames are welded together at the same time to isolate adjacent positive and negative areas of the plates.

The only method commercially utilized to paste modular battery collectors uses a pasting machine similar to that disclosed in U.S. Pat. No. 4,307,758 to W. McDowall et al. which is designed to paste collector assemblies having a mesh current collector. That pasting machine incorporates a number of paste extrusion nozzles communicating with a paste reservoir. When the machine is being operated, flow of paste through the extrusion nozzles is controlled by sliding gate valves mounted over the nozzle orifices. Each nozzle is mounted, and its associated valve actuated, so that discrete paste strips are extruded from a nozzle orifice and laid on a collector assembly in each of its paste areas. After the extruded paste strips are laid over the collector assembly, the collector assembly is conveyed downline to set the paste. The paste is set in the collector assembly by ultrasonic horns which vibrate the paste, forcing the paste to settle through the mesh current collector.

While this machine has various advantages, especially as compared to conventional pasting machines which are wholly unsuited for pasting collector assemblies for modular batteries, it suffers from a number of deficiencies. One such deficiency relates to finish control over the paste which is applied to a collector assembly. That is, the amount, thickness, uniformity, and coverage of finished paste often is unacceptable and is difficult to control in a reliable and reproducible manner. Such finish control problems arise from a number of sources and can lead to various performance-related problems.

The thickness of the paste layer applied to a collector assembly by the McDowall machine is controlled, at least in theory, by varying the thickness of the strip extruded from the nozzle, which in turn is controlled by varying the dimensions of the nozzle orifice. Apart from the various finish control problems inherent elsewhere in the process, as discussed below, sizing the paste layer by varying orifice dimensions in an extrusion nozzle can be troublesome. Especially when thinner strips are extruded, it has been observed that the extrusion nozzle has a tendency to clog. Thus, the machine suffers significant downtime while the nozzle is removed and cleaned.

Moreover, a paste strip, as it is ultrasonically vibrated in the McDowall machine, tends to penetrate through the collector mesh unevenly. Paste tends to accumulate in central areas of the mesh, frequently to the extent that perimeter areas of the collector are exposed. Ultrasonic vibration also causes localized, variation in thickness, referred to as "pebblestoning" for its visual resemblance to its namesake. Ultrasonic vibration also can cause some of the paste strip to penetrate too far through the mesh current collector, to the extent that it creates unwanted projections from the other face of the plate. It is necessary to "denib" the paste surface; and this removes a certain, but unpredictable, amount of paste from each collector assembly. This lack of uniform amounts, thickness, and coverage of paste causes uneven current distribution from the completed plate, and exposed portions of the mesh current collector are subject to corrosion by sulfuric acid electrolyte.

Moreover, because the finish control is unreliable, paste often is applied to a level beyond the surfaces of the frame. This means that the pasted collector assemblies must be dried before they can be stacked. Otherwise, the paste will cause adjacent stacks to stick together, and plates will be damaged upon separation.

The alignment of the extrusion nozzle relative to the pasting area of a collector assembly also is subject to variation. Such misalignment problems, as well as ultrasonic vibration, can cause paste to be spread on the frame where obviously no paste should be present. As a practical matter, therefore, each collector frame must be cleaned prior to welding a battery stack together. Otherwise, it is very likely that a battery so formed will leak.

The plates are cleaned by mechanical action, and that process often damages the plates, causing waste and scrap. Cleaning the plates also removes a certain amount of paste, which will vary from plate to plate, further diminishing the finish control of the process. Drying of the plates is a prerequisite for cleaning as well.

Drying entails passing the pasted collector assemblies through a tunnel oven. The temperature of the oven must be kept relatively low, however, to prevent melting of the thermoplastic frames. The drying time, therefore, must be extended by reducing the speed at which pasted collector assemblies are passed through the oven as compared to the higher speeds and outputs in oven-drying of traditional battery plates. Consequently, the oven-drying stage considerably slows the overall output of a pasting line using the McDowall machine: outputs of about 40 grids/minute as compared to outputs of 120 grids/minutes or more for other types of pasting machines.

Cleaning, denibbing, and vibrating the paste applied to collector assemblies also generate lead dust. This lead dust may create a potential hazard and may have to be removed from the air at significant expense and effort.

Finally, the McDowall machine is poorly suited to paste collector assemblies which have an unperforated metallic sheet as the current collector since it is designed to ultrasonically force the extruded paste strip through a mesh current collector. Pasting a collector assembly with a foil current collector would require passing each collector assembly through the McDowall machine twice. Moreover, pasting a foil collector would require that thinner strips be extruded from the extrusion nozzles which, as noted, can lead to more frequent clogging of the nozzle. It also is difficult to obtain intimate electrical contact between the extruded paste strip and the foil collector.

An object of this invention, therefore, is to provide methods and apparatus for pasting battery current collectors, especially modular battery current collectors, which are faster than conventional methods and apparatus for pasting modular current collectors.

It also is an object to provide such pasting methods and apparatus which provide better finish control of paste applied to a current collector as compared to conventional methods which may produce unevenness and poor coverage control.

Another object of this invention is to provide pasting methods and apparatus which reduce waste caused by damage to the plates during cleaning of the frame as compared to methods and apparatus which rely on physical cleaning of frames that are contaminated with paste as a collector assembly is pasted.

A further and related object is to provide such methods and apparatus which minimize or even eliminate the need to clean the current collector frames after pasting.

It is a further object of this invention to provide current collector pasting methods and apparatus which generate less lead dust than methods and apparatus which rely on cleaning, denibbing, and ultrasonically vibrating paste applied to a collector assembly.

Yet another object of this invention is to provide current collector pasting methods and apparatus which reduce the amount of downtime caused by clogging of nozzles.

A further object is to provide such methods and apparatus which more efficiently paste collector assemblies having a current collector which is an unperforated metallic sheet.

It also is an object of this invention to provide current collector pasting methods and apparatus wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides an apparatus for pasting a battery collector assembly having a current collector and enlarged members having a top surface and a bottom surface and a thickness greater than the current collector. The current collector has at least one predetermined area into which paste is to be filled to a predetermined first level on one side of the current collector and a predetermined second level on the other side of the current collector to form a paste layer of predetermined thickness less than the thickness of the enlarged members.

The apparatus comprises a reservoir for electrochemically active paste, a paste-dispensing nozzle having an orifice located in a dispensing end of the nozzle, and a feed conduit connecting the paste reservoir and dispensing nozzle and operable to supply paste to the dispensing nozzle. The nozzle is mounted to dispense paste in at least one paste area of the collector assembly. A valve is provided which is operable to control the flow of paste from the nozzle such that paste is dispensed therefrom and flows into the paste area.

The nozzle dispensing end is adapted to size the first level of paste dispensed in the paste area, and a surface is provided opposite the dispensing end of the nozzle which is adapted to size the second level of paste dispensed in the paste area. The clearance between the nozzle dispensing end and opposing sizing surface is adjusted such that paste is dispensed from the nozzle, flows into the paste area of the collector assembly, and is sized such that the first level is intermediate the top surface of the enlarged members and the current collector and the second level is intermediate the current collector and the bottom surface of the enlarged members. Thus, the enlarged portions of the collector assembly are left substantially free of paste.

Preferably, the opposing sizing means includes a roller or a second paste-dispensing nozzle. Also, the valve preferably is operable to dispense paste only when a paste area of the current collector is adjacent the nozzle. Other embodiments of the apparatus may include dispensing nozzles which are mounted for movement transverse to a conveyor path, and apparatus where the pasting zone is horizontally oriented.

The apparatus of the subject invention preferably is adapted to paste a collector assembly for a modular battery, such collector assemblies having a current collector mounted in a thermoplastic frame. The frame has two or more vertical members and two or more horizontal members defining one or more areas into which paste is to be filled to a predetermined first level on one side of the current collector and a predetermined second level on the other side of the current collector to form a layer of predetermined thickness less than the thickness of the vertical frame members. The vertical members have a top surface and a bottom surface and a thickness greater than the current collector. The dispensing end of the nozzle has a width slightly less than the distance between the vertical frame members defining the paste area, and the nozzle is mounted such that the dispensing end of the nozzle extends between the vertical frame members defining the paste area as it is pasted.

The apparatus of the subject invention also can be adapted to paste collector assemblies having a current collector which is an unperforated metallic sheet. For such pasting operations, the apparatus include opposing dispensing nozzles such that paste is dispensed to the paste area on both sides of the sheet.

The subject invention also provides a method for fabricating pasted battery plates. The method comprises providing a collector assembly which includes a current collector and enlarged members having a top surface and a bottom surface and a thickness greater than the current collector. The current collector has at least one predetermined area into which paste is to be filled to a predetermined first level on one side of the current collector and a predetermined second level on the other side of the current collector to form a paste layer of predetermined thickness less than the thickness of the enlarged members. The method also comprises providing a paste-dispensing nozzle having a dispensing end and an orifice in the dispensing end, positioning the dispensing end of the nozzle at a level intermediate the top surface of the enlarged members and the current collector, dispensing paste through the nozzle orifice into the paste area, sizing the first level of the paste with the nozzle dispensing end while leaving the top surface of the enlarged members substantially free of paste, and sizing the second level of the paste while leaving the bottom surface of the enlarged members substantially free of paste.

The subject invention also provides a method for pasting collector assemblies for modular batteries. The method comprises providing a paste-dispensing nozzle having a dispensing end and an orifice in the dispensing end. The width of the nozzle dispensing end is slightly less than the distance between adjacent vertical frame members defining a paste area. The method further comprises positioning the dispensing end of the nozzle between the adjacent vertical frame members at a level intermediate the top surface of the vertical frame members and the current collector, dispensing paste through the nozzle orifice such that it flows into the paste area, sizing the first level of the paste with the nozzle dispensing end while leaving the top surface of the vertical frame members substantially free of paste, and sizing the second level of the paste while leaving the bottom surface of the vertical frame members substantially free of paste.

It will be appreciated, therefore, that by using the pasting apparatus of the subject invention, the speed, efficiency, and finish control in pasting collector assemblies for modular batteries can be improved significantly. For example, paste is dispensed by the nozzle and flows directly into the paste area of a collector assembly, as compared to placing an extruded strip on the collector assembly, and there is no need for ultrasonic vibration of the paste. The hazardous lead dust and finish control problems associated with ultrasonic vibration, therefore, are avoided.

The dispensing end of the nozzle is adapted so that it may be placed between vertical frame members. This configuration and placement of the dispensing end of the nozzle, along with control of the paste flow, ensures that paste is dispensed only in predetermined paste areas and not on the collector assembly frame. Thus, cleaning of the frame before the plates are assembled for welding is no longer necessary, and dust and scrap are reduced.

Further, because the paste layer is sized to a thickness less than the vertical frame members, it is possible to stack pasted grids on their vertical frame members without bringing the paste in adjacent plates into contact. Since the frames do not require cleaning, and they also do not have to be dried to stack them, drying in a tunnel oven is no longer necessary. The plates can air dry. By eliminating oven-drying, the speed of the overall pasting process is increased dramatically.

Further, by utilizing nozzles to simply dispense paste, rather than extrude it in thin, preformed strips, the nozzle orifice may be enlarged so that clogging of the nozzle is much less of a problem. Thus, the pasting apparatus will experience less downtime.

Finally, it will be appreciated that by using two paste-dispensing nozzles, it is possible to paste a collector assembly having a current collector which is an unperforated metal sheet in a single pass through the machine. Allowing the paste to flow into the pasting area, as opposed to ultrasonically settling an extruded strip, also provides better electrical contact between the paste and the current collector. There is no need to extrude a thin strip of paste, and so the clogging of nozzles which is associated therewith is avoided as well.

BRIEF DESCRIPTION OF THE DRAWINGS

FIG. 4 is an enlarged cross-sectional view taken generally along line 4—4 of FIG. 2, showing in particular and in greater detail a collector assembly 10 as it passes through a pasting zone of the apparatus 20; and FIG. 5 is a cross-sectional view similar to FIG. 4 showing the pasting zone of an alternate embodiment of the pasting apparatus of the subject invention particularly suited to paste collector assemblies having an unperforated foil current collector. In the drawings, it will be understood that a reference numeral followed by a lower case letter is a reference to a particular one of substantially identical features or components, the reference numeral alone being a generic or collective reference to such features or components. For example, the illustrated apparatus includes six nozzles identified generically and collectively by the numeral "40"; "40a, 40b, 40c, 40d, 40e, and 40f" being used when it is necessary or desirable to refer to a particular one of the six nozzles.

DETAILED DESCRIPTION OF THE INVENTION

Figure 1:
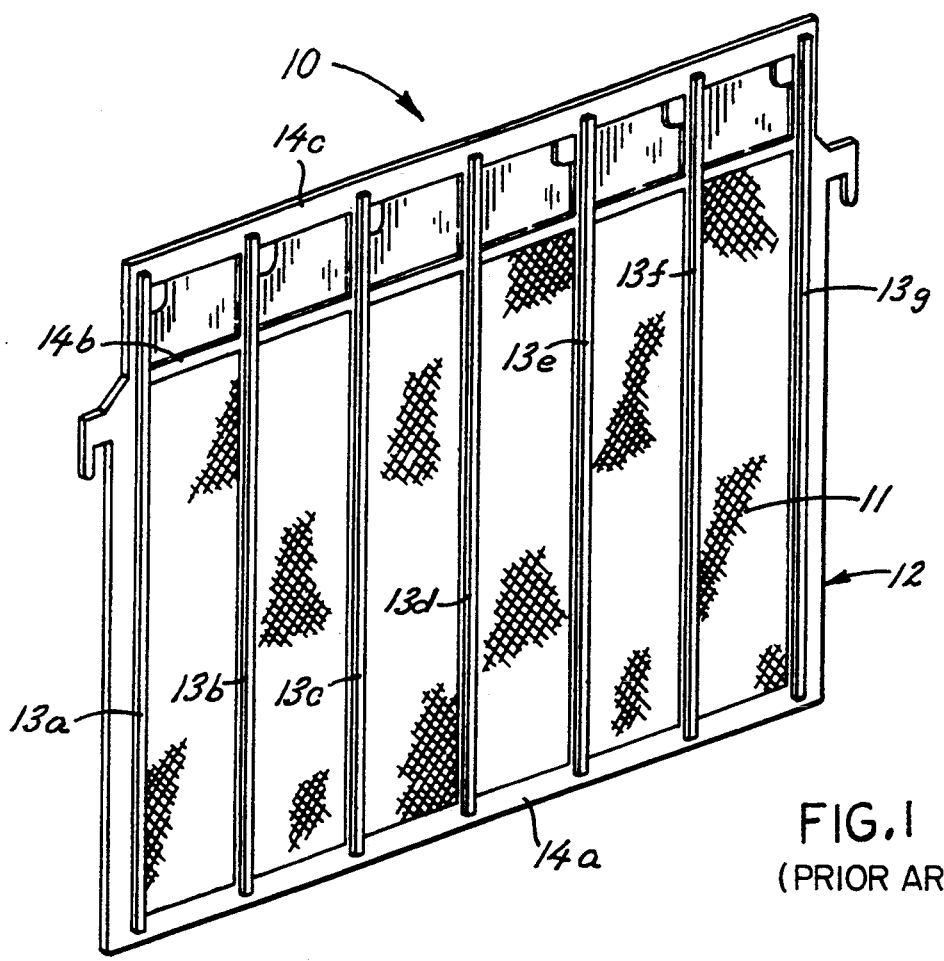
FIG. 1 is a perspective view of a collector assembly 10 suitable for a modular battery, as is known, which can be pasted by the apparatus and methods of the subject invention.

FIG. 1 shows a prior art collector assembly 10 suitable for use in a modular battery. The collector assembly 10 has a mesh current collector 11 molded into a thermoplastic frame 12. The frame 12 has seven vertical members 13a to 13g and three horizontal members 14a to 14c having top and bottom surfaces. The vertical frame members 13 and horizontal frame members 14 are enlarged relative to the current collector. That is, the frame members 13 and 14 are thicker than the current collector 11, the vertical frame members 13 being thicker than the horizontal frame members 14. The frame 12 is adapted such that, when stacked together with separator assemblies having compatibly designed frames, the frames can be welded together to form a battery container and appropriate internal cell dividers.

The vertical frame members 13 and horizontal frame members 14a and 14b also define six paste areas, i.e., areas into which paste is dispensed to the current collector 11 to form a plate. More specifically, as described in detail below, paste is filled in the paste areas of the collector assembly 10 to a first level on one side of the current collector 11 intermediate the rod surfaces of the vertical frame members 13 and the current collector 11 and a second level of the other side of the current collector 11 intermediate the bottom surfaces of the vertical frame members 13 and the current collector 11 to form a paste layer of predetermined thickness less than the thickness of the vertical frame members 13. The areas defined by vertical frame members 13 and horizontal frame members 14b and 14c are not filled with paste, those areas ultimately forming part of a generally open area in the upper part of an assembled battery which accommodates terminal connectors and the like.

It will be appreciated, however, that the collector assembly 10 is used for convenience in describing the apparatus of the subject invention. Collector assemblies for modular batteries may differ in certain respects. They may have more or fewer paste areas, and the apparatus of the subject invention may be adapted accordingly. Moreover, while the pasting apparatus of the subject invention has particular utility and advantage in pasting collector assemblies of the illustrated type or similar designs, other collector assemblies for modular batteries may be pasted using apparatus and methods of the subject invention. Current collectors for traditionally designed lead-acid batteries also may be pasted with apparatus of the subject invention, as will be discussed below.

Further, it will be appreciated that relative terms such as "vertical," "horizontal," "top," "bottom," and the like are used for convenience in describing the collector assemblies and the apparatus of the subject invention. The novel apparatus can be adapted to paste collector assemblies in various orientations, as will become apparent from the discussion which follows.

Figure 3:
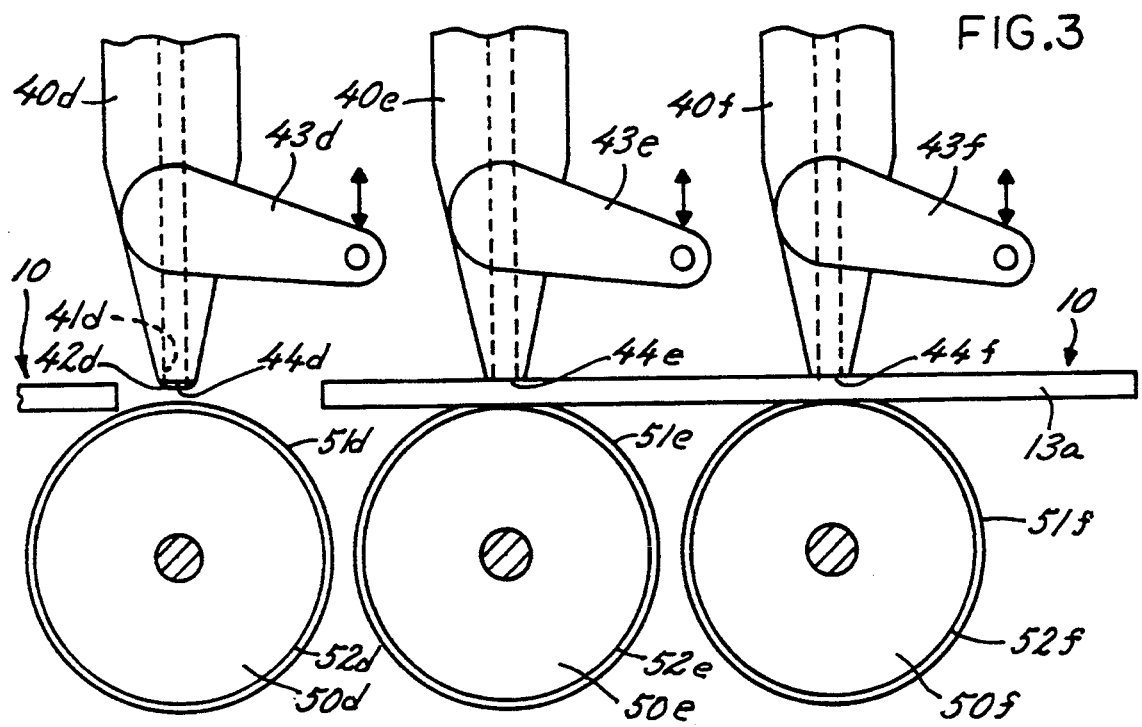
FIG. 3 is an enlarged side view taken generally in the area denoted by line 3—3 of FIG. 2, omitting, for the sake of clarity, the conveyor.
Figure 2:
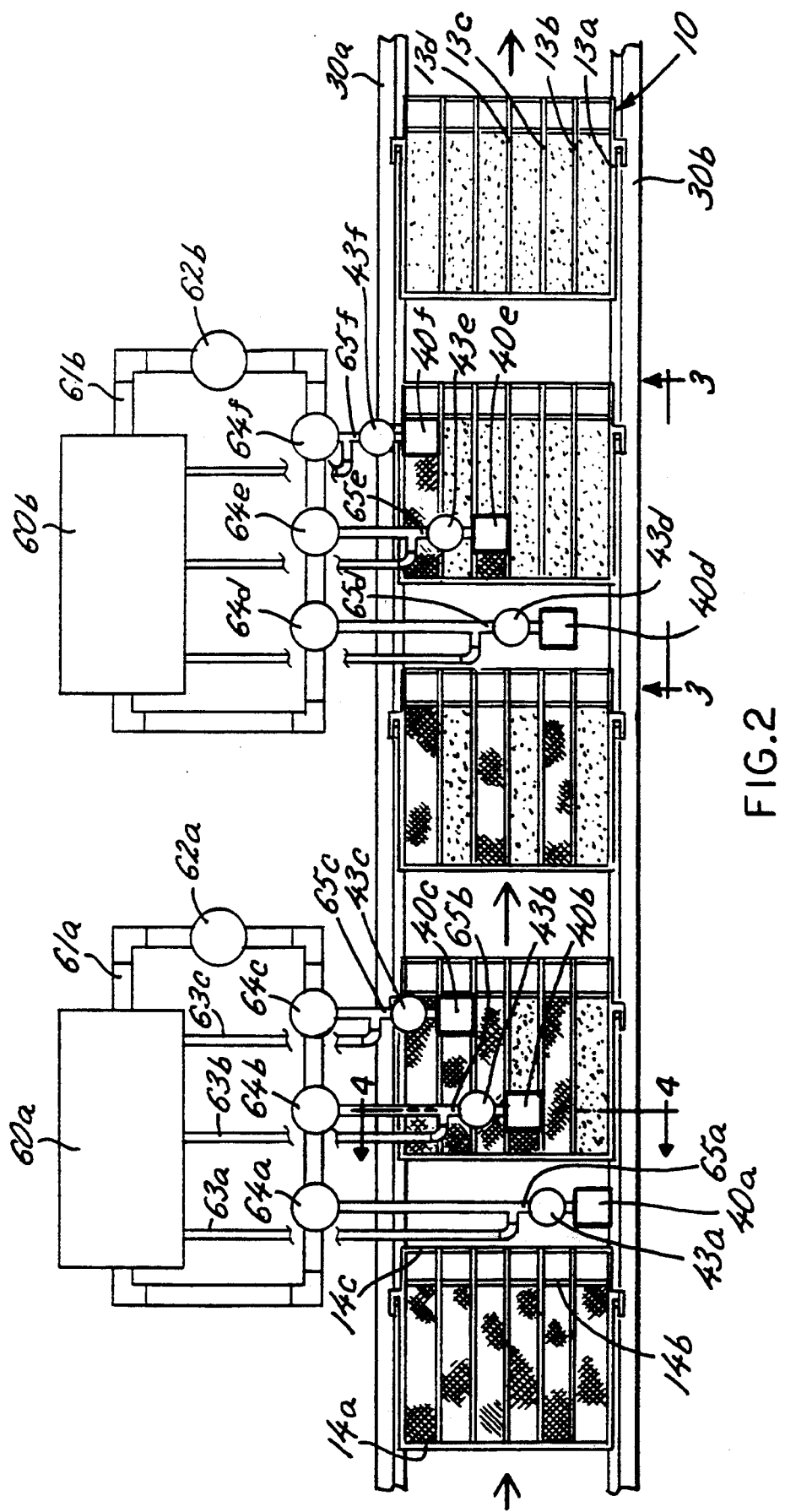
FIG. 2 is a top schematic view of a preferred embodiment 20 of the pasting apparatus of the subject invention, showing a succession of collector assemblies for a modular battery being pasted by a plurality of paste-dispensing nozzles.

FIGS. 2–4 illustrate a preferred embodiment 20 of the subject invention. The apparatus 20 preferably is provided with a conveyor which is suitable for transporting collector assemblies 10. The illustrative embodiment 20 has a conveyor system which includes a pair of rails 30a and 30b, as shown in FIG. 2, and is constructed generally as shown in the McDowall et al. '758 patent. It will be appreciated, however, that the apparatus of the subject invention may be provided with other conveyor systems, and such systems are well known to workers in the art.

As can be seen in FIGS. 2–3, the collector assemblies 10 are transported in succession through pasting zones located between and defined generally by a plurality of paste-dispensing nozzles 40 and sizing rollers 50. In this preferred embodiment, there are six paste-dispensing nozzles 40a to 40f and six sizing rollers 50a to 50f, thereby providing a pasting zone associated with each paste area of the collector assemblies 10.

Each nozzle 40 has an orifice 41 through which paste is dispensed. The orifice 41 is located in a dispensing end 42 of the nozzle 40. A valve 43 is provided in each nozzle 40 to control the flow of paste from the orifice 41. The nozzles 40 are mounted, and the valves 43 controlled to dispense paste through the orifices 41 into the paste areas in a manner described in more detail below.

The paste is generally formulated in accordance with whatever specific performance characteristics are desired in the completed battery. A wide variety of electrochemically active pastes are known to workers in the art and may be used in the subject invention. It will be appreciated, however, that the paste should have a consistency such that it may be dispensed and flow into the paste areas as described further below.

The precise size and configuration of the nozzle orifices 41 can be varied in accordance with well known principles so long as paste is dispensed therefrom in such a manner as to completely fill the paste area where it can be sized as described in more detail below. It will be appreciated, however, that because the nozzles 40 are intended to dispense paste and allow it to flow into paste areas, as compared to extruding and laying strips of paste, the orifices 41 of the nozzles 40 used herein can be, and preferably are, made somewhat larger than orifices in extrusion nozzles which are used to size the layer of paste applied to a current collector. In apparatus of the subject invention, sizing of the paste layer which is applied to a current collector is not controlled by the size of the nozzle orifice; and relatively thin layers of paste may be formed with relatively large orifices. Thus, the orifices in the paste-dispensing nozzles used in the apparatus of the subject invention will have less tendency to clog, and the apparatus will experience less downtime while the nozzles are cleaned.

Paste is supplied to the nozzles 40 by an appropriate feed conduit system. As can be seen in FIG. 2, the illustrative preferred embodiment of the invention comprises reservoirs 60 into which fully constituted paste is poured. Reservoir 60a contains paste suitable for a positive plate, and reservoir 60b contains paste suitable for a negative plate.

A primary circuit 61 is associated with each reservoir 60. Each primary circuit 61 is provided with a suitable pump 62 to circulate paste from the reservoir 60 through the primary circuit 61 and back to the reservoir 60. There are six secondary circuits 63a to 63f (shown for convenience as disconnected), three communicating with each primary circuit 61. Pumps 64 are provided to circulate paste from the primary circuits 61 through each associated secondary circuit 63 and back to the reservoirs 60. Diversion conduits 65 communicating with each secondary circuit 63 supply paste to its associated nozzle 40.

Further details of such feed conduit systems for delivering paste to a nozzle are disclosed in the McDowall et al. '758 patent, and a system such as that or its equivalent is preferred for the reasons disclosed in that patent. It will be appreciated, however, that other feed conduit systems may be used to supply paste to the nozzles and control the flow of paste therefrom, and such designs are well known to the worker in the art.

As best seen in FIG. 2, collector assemblies 10 are transferred on the conveyor 30 such that the vertical frame members 13 are oriented in a direction along the path of conveyor 30. As the collector assemblies 10 are transported along the conveyor 30, the leading end of the paste area defined by vertical frame members 13a and 13b and horizontal frame members 14a and 14b enters the pasting zone between nozzle 40a and roller 50a. At this point, the valve 43a is opened to begin dispensing paste from the nozzle 40a into the paste area. The paste flows into the paste area; and, as the collector assembly 10 is transported through the pasting zone, the paste is sized by the nozzle dispensing end 42a and sizing surface 51a of roller 50a as described in further detail below. When the trailing end of the paste area leaves the pasting zone, the valve 43a is closed to stop the dispensing of paste from nozzle 40a. Paste is dispensed in the remaining pasting areas in a similar fashion as the collector assemblies 10 are transported further along the path of the conveyor 30.

In accordance with the subject invention, the nozzles 40 and sizing rollers 50 are mounted and the clearance therebetween adjusted such that the paste dispensed from the nozzle is sized to levels intermediate the current collector 11 and the vertical members 13, so that the vertical members 13 are left substantially free of paste. More specifically, the dispensing ends 42 of the nozzles 40 are adapted to size the paste which is dispensed from the nozzle orifices 41 to a first predetermined level on one side of the current collector 11 intermediate the current collector 11 and the top surfaces of vertical frame members 13. That is, when a collector assembly 10 is in a pasting zone, as shown in FIG. 4, the dispensing end 42b of the nozzle 40b extends between the vertical frame members 13c and 13d on the top side of the current collector 11, the width of the nozzle dispensing end 42b being slightly less than the distance between the vertical frame members 13c and 13d so that the nozzle 40b may be so situated. Nozzles 42a, 42c, 42d, 42e, and 42f are of like construction and are mounted in a like manner in respect to their associated paste areas.

As the collector assembly 10 is transported through a pasting zone by conveyor 30, therefore, the level of paste on the upper side of the current collector 11 is determined by the level to which the dispensing ends 42 of the nozzles 40 are inserted between the vertical frame members 13. The nozzle preferably is provided with shoulders 44, which abut the top surfaces of vertical frame members 13, to insure that the dispensing end 42 of the nozzle 40 is inserted between the vertical frame members 13 to the appropriate depth. It will be appreciated that other surfaces for locating the depth of the nozzle dispensing end 42, such as rollers, or other means of controlling the position of the nozzle relative to the collector assembly are known and may be used.

The rollers 50 provide a similar sizing function. Accordingly, each roller 50 has a sizing surface 51 which extends between the vertical frame members 13 on the bottom side of the current collector 11 of a collector assembly 10 located in the pasting zone. The roller 50 preferably is provided with shoulders 52 to insure that the sizing surface 51 is set at the appropriate depth. In this manner, the sizing surface 51 sizes the paste to a second predetermined level on the bottom side of the current collector 11 intermediate the current collector 11 and vertical frame members 13.

The rollers 50 have been found to provide good sizing of the lower level of paste and smoothly accommodate passage of the collector assemblies 10 through the pasting zone. It will be appreciated, however, that suitable surfaces for sizing the lower surface of paste applied to a pasting area may be provided by other structures, such as a plate or, especially when the current collector is an unperforated metal sheet, an opposing dispensing nozzle constructed in a like manner as nozzle 40, as discussed in detail below.

It will be appreciated, therefore, that the pasting apparatus of the subject invention provides better finish control in pasting current collectors for modular batteries. The paste is dispensed by the nozzles 40 and flows directly into the paste area of a collector assembly, and it is not necessary to set the paste by ultrasonic vibration. Thus, the various finish control problems associated with ultrasonic vibration are avoided.

Since the paste flows directly from the nozzles 40 into the paste area, paste completely fills the paste area and does not leave portions of the current collector 11 unpasted and exposed to corrosive electrolyte. Further, the nozzles 40 and rollers 50 size the paste layer to a very uniform thickness.

The valves 43 are operated to control the flow of paste from the nozzles 40 so that the paste is not dispensed on the horizontal members 14 or in the areas defined by vertical member 13 and horizontal members 14b and 14c which must not be pasted. Importantly, the nozzles 40 and rollers 50 extend between the vertical frame members 13 and size the paste to levels intermediate the outer surfaces of the vertical frame member 13 and the current collector 11 thereby avoiding the contamination of those surfaces with paste.

As can be seen best in FIG. 4, the clearance between the nozzle dispensing ends 42 and the sizing surfaces 51 of the rollers 50 is approximately equal to the thickness of the horizontal frame members 13 so that passage of the horizontal frame members 14 therethrough is accommodated. For thicker horizontal frame members, or if paste is to be applied at a level below the horizontal frame members, the nozzles 40 or rollers 50 may be mounted for relative movement such that the clearance therebetween can be increased to allow passage of the horizontal frame members and decreased to dispense paste.

It will be appreciated, therefore, that by using the apparatus of the subject invention there is little likelihood that paste will be dispensed on the frame members 13 and 14, and various benefits derive from this more accurate and more reproducible finish control. First, since the frame members 13 and 14 are left substantially free of paste, it is not necessary to clean the pasted collector assemblies 10 prior to welding them together. Further, because the thickness of the paste applied to the collector assembly 10 is less than the thickness of the vertical frame members, it is possible to stack pasted collector assemblies 10 on their respective vertical frame members 13, also without oven-drying of the pasted collector assemblies It also will be appreciated that eliminating an oven-drying step dramatically increases the output of the pasting process as a whole, as oven-drying created a bottleneck in prior art pasting lines.

Details of an alternate embodiment are shown in 5. This alternate embodiment is especially preferred for pasting collector assemblies 110 having, as shown in FIG. 5, a current collector 111 which is an unperforated metallic sheet mounted in a frame 112 having vertical frame members 113 and horizontal frame members 114. The collector assembly 110 otherwise is identical to the collector assembly 10 discussed above which has a mesh current collector 111.

As shown in FIG. 5, this second preferred embodiment is provided with opposing dispensing nozzles 140 having orifices 141. There are six sets of such opposing nozzles 140, but the second preferred embodiment otherwise is identical to the first preferred embodiment 20 discussed above.

The nozzles 140 have shoulders 144 and are similar to the nozzles except that the dispensing end 142 of each nozzle 140 is provided with a pair of narrow nibs 145 which extend beyond the dispensing end 142 on each side thereof. Each opposing pair of nozzles 140 dispense and size paste in a manner similar to nozzles 40 and rollers 50, except, of course, that paste is dispensed from both sides of the current collector 111. Moreover, the nibs 145 on the dispensing ends 142 of the nozzles 140 leave narrow portions of the metal sheet 111 immediately adjacent the vertical frame members 113 exposed as the paste areas of the collector assembly 110 otherwise are filled. Such exposed metal sheet areas are necessary for certain battery applications, but it will be appreciated that the nibs 145 can be, and preferably are, eliminated if the presence of such exposed metal is not necessary.

It will be appreciated, therefore, that this opposing nozzle arrangement is particularly useful for pasting collector assemblies having a collector which is an unperforated metal sheet. Since paste is dispensed from both sides of the collector, it is not necessary to pass a collector assembly through the machine twice. The paste can flow into intimate contact with the current collector, and relatively thin layers of paste can be applied without causing undue clogging of the nozzles. The opposing nozzle arrangement of this second embodiment, however, also may be used to paste collector assemblies with mesh current collectors.

This invention has been disclosed and discussed primarily in terms of specific embodiments thereof, but it is not intended to be limited thereto. For example, the apparatus has been described in terms of an embodiment wherein the paste is dispensed as the collector assemblies are moved relative to a stationary dispensing nozzle. The dispensing nozzles, however, may be mounted for movement relative to a stationary grid. For example, the collector assemblies may be transported on a conveyor such that the pasting area is transverse to the conveyor path. A collector assembly may be transported into a pasting zone and stopped momentarily while the nozzle moves and dispenses paste across the pasting area.

Moreover, the apparatus has been described in terms of pasting a collector assembly having a frame, that frame constituting a portion of the container in an assembled modular battery. In traditionally designed lead-acid batteries, however, the container is premolded, and current collectors for such batteries traditionally have not had unpasted, enlarged frames or analogous members. It would be appreciated, however, that current collectors for traditionally designed batteries can be provided with suitable enlarged members, such as a pair of thermoplastic elongated members on two opposing edges of the current collector, and the collector thereafter pasted with apparatus of the subject invention.

Also, the nozzles, when coupled with sizing rollers, have been described as dispensing paste from a position above the pasting zone and the paste area of a collector assembly. The nozzle, however, may be mounted below the pasting zone so that paste is dispensed into the paste area from below the collector assembly. Likewise, the pasting zone has been illustrated as being vertically oriented, i.e., the nozzles and other sizing surfaces are located above and below the generally horizontal path of the collector assemblies through the pasting zone. It will be appreciated, however, that the nozzles and other sizing surfaces may be mounted generally opposite each other in a horizontal plane, thereby providing a horizontally-oriented pasting zone through which the collector assemblies may be transported in a generally vertical plane. Other modifications and embodiments will be apparent to workers in the art.

We claim as our invention:

1. An apparatus for pasting a collector assembly having a current collector and enlarged members having a top surface and a bottom surface and a thickness greater than the current collector, the collector assembly having at least one area into which paste is to be filled to a first level on one side of the current collector and a second level on the other side of the current collector to form a paste layer having a thickness less than the thickness of the enlarged members, the apparatus comprising:

a reservoir for electrochemically active paste;
 a paste-dispensing nozzle having a dispensing end and an orifice in the dispensing end and mounted to dispense paste in at least one paste area of the collector assembly;
 a feed conduit connecting the paste reservoir and nozzle operable to supply paste to the nozzle;
 a valve operable to control the flow of paste from the nozzle such that paste is dispensed therefrom and flows into the paste area;
 the nozzle dispensing end being adapted to size the first level of paste dispensed in the paste area; and
 a surface opposite the dispensing end of the nozzle adapted to size the second level of paste dispensed in the paste area;
 the clearance between the nozzle dispensing end and opposing sizing surface being adjusted such that paste is dispensed from the nozzle, flows into the paste area of the collector assembly, and is sized such that the first level is intermediate the top surface of the enlarged members and the current collector and the second level is intermediate the current collector and the bottom surface of the enlarged members thereby leaving the enlarged portions of the collector assembly substantially free of paste.

2. The pasting apparatus of claim 1, wherein the nozzle dispensing end is adapted to pass between the enlarged portions of the collector assembly as paste is dispensed to the paste area.

3. The pasting apparatus of claim 1, wherein the feed conduit includes a primary circuit communicating with the reservoir, a pump operable to circulate paste from the reservoir through the primary circuit, a secondary circuit communicating with the primary circuit and the reservoir, a pump operable to circulate paste from the primary circuit through the secondary circuit, and a diversion conduit communicating with the secondary circuit and the nozzle, wherein the valve is located in the diversion conduit such that a portion of the paste circulating in the secondary circuit is diverted to the nozzle when the valve is open.

4. The pasting apparatus of claim 1, wherein the apparatus includes a roller mounted opposite to the nozzle dispensing end having a surface adapted to size the second level of paste dispensed in the paste area.

5. The pasting apparatus of claim 1, wherein the apparatus includes:

a second paste-dispensing nozzle having a dispensing end and an orifice in the dispensing end and mounted opposite to the first paste-dispensing nozzle to dispense paste in the paste area;
 feed conduit connecting the reservoir and second nozzle operable to supply paste to the second nozzle; and a valve operable to control the flow of paste from the second nozzle such that paste is dispensed therefrom and flows into the paste area;

the dispensing end of the second nozzle being adapted to size the second level of paste dispensed in the paste area.

6. The pasting apparatus of claim 5, wherein the current collector of the collector assembly is an unperforated metal sheet.

7. The pasting apparatus of claim 6, wherein the paste dispensing nozzle includes a pair of nibs extending beyond the dispensing end of the nozzle on each side thereof.

8. The pasting apparatus of claim 1, wherein the current collector of the collector assembly is a metallic mesh.

9. The pasting apparatus of claim 1, wherein:

the apparatus includes a conveyor operable to transport collector assemblies in a path such that the paste area of the collector assembly passes through a pasting zone between the nozzle dispensing end and opposing sizing surface, thereby defining a leading end and a trailing end of the paste area relative to its transport through the pasting zone;

the dispensing end of the nozzle extends in a direction transverse to the conveyor path a distance less than the width of the paste area; and the valve is operable to dispense paste as the leading end of the paste area enters the pasting zone and to interrupt the flow of paste as the trailing end of the paste area leaves the pasting zone.

10. The pasting apparatus of claim 9, wherein the pasting zone is vertically-oriented and the conveyor path through the pasting zone is horizontal.

11. The pasting apparatus of claim 9, wherein the pasting zone is horizontally-oriented and the conveyor path through the pasting zone is vertical.

12. The pasting apparatus of claim 1, wherein the apparatus includes a conveyor operable to transport collector assemblies in a path such that the paste area of the collector assembly passes through a pasting zone between the nozzle dispensing end and opposing sizing surface;

the dispensing end of the nozzle extends in a direction along the conveyor path a distance less than the width of the paste area;

the nozzle is mounted for movement transverse to the conveyor path a distance substantially equal to the length of the paste area; and the valve is operable to dispense paste as the nozzle moves across the paste area.

13. The pasting apparatus of claim 12, wherein the pasting zone is vertically-oriented and the conveyor path through the pasting zone is horizontal.

14. The pasting apparatus of claim 12, wherein the pasting zone is horizontally-oriented and the conveyor path through the pasting zone is vertical.

15. An apparatus for pasting a collector assembly which comprises a current collector mounted in a thermoplastic frame, the frame having two or more vertical members and two or more horizontal members defining at least one area into which paste is to be filled to a first level on one side of the current collector and a second level on the other side of the current collector to form a paste layer having a thickness less than the thickness of the enlarged members, the vertical members having a top surface and a bottom surface and a thickness greater than the current collector, wherein the apparatus comprises:

a reservoir for electrochemically active paste;

a paste-dispensing nozzle having a dispensing end and an orifice in the dispensing end and mounted to dispense paste in at least one paste area of the collector assembly, the dispensing end of the nozzle having a width less than the distance between the vertical frame members defining the paste area;

a feed conduit connecting the paste reservoir and nozzle and operable to supply paste to the nozzle;

a valve operable to control the flow of paste from the nozzle such that paste is dispensed therefrom and flows into the paste area;

the dispensing end of the nozzle being adapted to size the first level of paste dispensed in the paste area;

a surface opposite the dispensing end of the nozzle adapted to size the second level of paste dispensed in the paste area; and a conveyor operable to transport collector assemblies in a path such that the paste area of the collector assembly passes through a pasting zone between the nozzle dispensing end and opposing sizing surface, thereby defining a leading end and a trailing end of the paste area relative to its transport through the pasting zone;

the nozzle being mounted such that the dispensing end of the nozzle, when the paste area of the collector assembly is in the pasting zone, extends between the vertical frame members defining the paste area at a level intermediate the surface of the vertical frame members and the current collector and the opposing sizing surface being mounted such that, when the paste area is in the pasting zone, it extends between the vertical frame members defining the paste area at a level intermediate the current collector and the bottom surface of the vertical frame members such that paste is dispensed from the nozzle, flows into the paste area, and is sized to a thickness less than the thickness of the vertical frame members, thereby leaving the vertical frame members substantially free of paste.

16. The pasting apparatus of claim 15, wherein the feed conduit includes a primary circuit communicating with the reservoir, a pump operable to circulate paste from the reservoir through the primary circuit, a secondary circuit communicating with the primary circuit and the reservoir, a pump operable to circulate paste from the primary circuit through the secondary circuit, and a diversion conduit communicating with the secondary circuit and the nozzle, wherein the valve is located in the diversion conduit such that a portion of the paste circulating in the secondary circuit is diverted to the nozzle when the valve is open.

17. The pasting apparatus of claim 15, wherein the apparatus includes a roller mounted opposite to the nozzle dispensing end having a surface adapted to size the second level of paste dispensed in the paste area.

18. The pasting apparatus of claim 17, wherein the sizing roller has a sizing surface having a width less than the distance between the vertical frame members defining the paste area.

19. The pasting apparatus of claim 15, wherein the apparatus includes:

a second paste-dispensing nozzle having a dispensing end and an orifice in the dispensing end and mounted opposite to the first paste-dispensing nozzle to dispense paste in the paste area;

feed conduit connecting the reservoir and second nozzle operable to supply paste to the second nozzle; and a valve operable to control the flow of paste from the second nozzle such that paste is dispensed therefrom and flows into the paste area;

the dispensing end of the second nozzle being adapted to size the second level of paste dispensed in the paste area.

20. The pasting apparatus of claim 19, wherein the current collector of the collector assembly is an unperforated metal sheet.

21. The pasting apparatus of claim 20, wherein the paste dispensing nozzle includes a pair of nibs extending beyond the dispensing end of the nozzle on each side thereof.

22. The pasting apparatus of claim 15 wherein the current collector of the collector assembly is a metallic mesh.

23. The pasting apparatus of claim 15, wherein the nozzles are provided with surfaces which, when the paste area of the collector assembly is in the pasting zone, abuts the top surface of the vertical frame members, thereby locating the dispensing end of the nozzle at a level intermediate the top surface of the vertical frame members and the current collector.

24. The pasting apparatus of claim 15, wherein the apparatus includes:

a paste-dispensing nozzle associated with each paste area of the collector assembly;

feed conduit connecting the paste reservoir to each nozzle and operable to supply paste to the nozzles;

a valve associated with each nozzle and operable to control the flow of paste from the nozzle;

the dispensing end of each nozzle being adapted to size the first level of paste dispensed in its associated paste area;

a surface opposite the dispensing end of each nozzle adapted to size the second level of paste dispensed in its associated paste area; and the conveyor is operable to transport grids in path such that each paste area of the collector assembly passes through a pasting zone between its associated nozzle and opposing sizing surface.

25. The pasting apparatus of claim 15, wherein:
the collector assemblies are transported on the conveyor such that the vertical frame members are oriented along the conveyor path;
the dispensing end of the nozzle is oriented such that its width extends in a direction transverse to the conveyor path; and
the valve is operable to dispense paste as the leading end of the paste area enters the pasting zone and to interrupt the flow of paste as the trailing end of the paste area leaves the pasting zone.

26. The pasting apparatus of claim 15, wherein:
the collector assemblies are transported on the conveyor such that the vertical frame members are oriented transverse to the conveyor path;
the dispensing end of the nozzle is oriented such that its width extends in a direction along the conveyor path;
the nozzle is mounted for movement transverse to the conveyor path a distance substantially equal to the length of the paste area; and
the valve is operable to dispense paste as the nozzle moves across the paste area.

27. The pasting apparatus of claim 15, wherein the pasting zone is vertically-oriented and the conveyor path through the pasting zone is horizontal.

28. The pasting apparatus of claim 15, wherein the pasting zone is horizontally-oriented and the conveyor path through the pasting zone is vertical.

29. The pasting apparatus of claim 15, wherein the paste-dispensing nozzles and opposing sizing surfaces are mounted for relative movement as a collector assembly passes through the pasting zone such that the clearance therebetween can be increased to allow passage of the horizontal frame members therebetween and decreased to size paste to the predetermined first and second levels.

30. A method for fabricating a pasted battery plate, which method comprises:

providing a collector assembly which includes a current collector and enlarged members having a top surface and a bottom surface and a thickness greater than the current collector, the collector assembly having at least one area into which paste is to be filled to a first level on one side of the current collector and a second level on the other side of the current collector to form a paste layer having a thickness less than the thickness of the enlarged members;

providing a paste-dispensing nozzle having a dispensing end and an orifice in the dispensing end;

positioning the dispensing end of the nozzle at a level intermediate the top surface of the enlarged members and the current collector;

dispensing paste through the nozzle orifice into the paste area and sizing the first level of the paste with the nozzle dispensing end while leaving the top surface of the enlarged members substantially free of paste; and sizing the second level of the paste while leaving the bottom surface of the enlarged members substantially free of paste.

31. A method for pasting a battery grid having a current collector mounted in a thermoplastic frame, the frame having two or more vertical members and two or more horizontal members defining at least one area into which paste is to be filled to first and second levels to form a paste layer having a thickness less than the thickness of the vertical frame members, the vertical members having a top surface and a bottom surface and a thickness greater than the current collector, wherein the method comprises:

providing a paste-dispensing nozzle having a dispensing end and an orifice in the dispensing end, the width of the nozzle dispensing end being less than the distance between adjacent vertical frame members defining a paste area;

positioning the dispensing end of the nozzle between the adjacent vertical frame members at a level intermediate the top surface of the vertical frame members and the current collector;

dispensing paste through the nozzle orifice into the paste area and sizing the first level of the paste with the nozzle dispensing end while leaving the top surface of the vertical frame members substantially free of paste; and sizing the second level of the paste while leaving the bottom surface of the vertical frame members substantially free of paste.

32. The pasting method of claim 31, wherein the method includes:

providing a roller opposite the paste-dispensing nozzle and having a sizing surface with a width less than the distance between the adjacent vertical frame members:

positioning the sizing surface of the roller between the adjacent vertical frame members at a level intermediate the current collector and the bottom surface of the vertical frame members; and sizing the second level of the paste with the sizing roller while leaving the bottom surface of the vertical frame members substantially free of paste.

* * * * *

UNITED STATES PATENT AND TRADEMARK OFFICE
CERTIFICATE OF CORRECTION

PATENT NO. : 5,385,587
DATED : January 31, 1995
INVENTOR(S) : David L. Lund, Donald W. Groff, James J. Bonk and Kenneth S. Rumsey It is certified that error appears in the above-indentified patent and that said Letters Patent is hereby corrected as shown below:

ON THE TITLE PAGE:

[57] ABSTRACT

Line 20, delete "stop" and substitute therefor -- top --.

Column 6, line 42, "In the drawings, ..." start as a new paragraph;

Column 7, line 9, delete "rod" and substitute therefor -- top --;

Column 8, line 34, delete "6Ob" and substitute therefor -- 60b --;

Column 10, line 51, after "shown in" insert -- FIG. --;

Column 10, line 59, delete "111" and substitute therefor -- 11 --; and

Column 10, line 67, after "nozzles" insert -- 40, --.

UNITED STATES PATENT AND TRADEMARK OFFICE
CERTIFICATE OF CORRECTION

PATENT NO. : 5,385,587

DATED : January 31, 1995

INVENTOR(S) : David L. Lund, Donald W. Groff, James J. Bonk and Kenneth S. Rumsey It is certified that error appears in the above-indentified patent and that said Letters Patent is hereby corrected as shown below:

IN THE CLAIMS:

Column 14, line 31, after "intermediate the" insert -- top --.

Signed and Sealed this

Twenty-fifth Day of April, 1995

*Attest:*

BRUCE LEHMAN

*Attesting Officer*    *Commissioner of Patents and Trademarks*